H. E. COFFIN.
EXPLOSION ENGINE.
APPLICATION FILED JUNE 27, 1910.
1,024,618.
Patented Apr. 30, 1912.
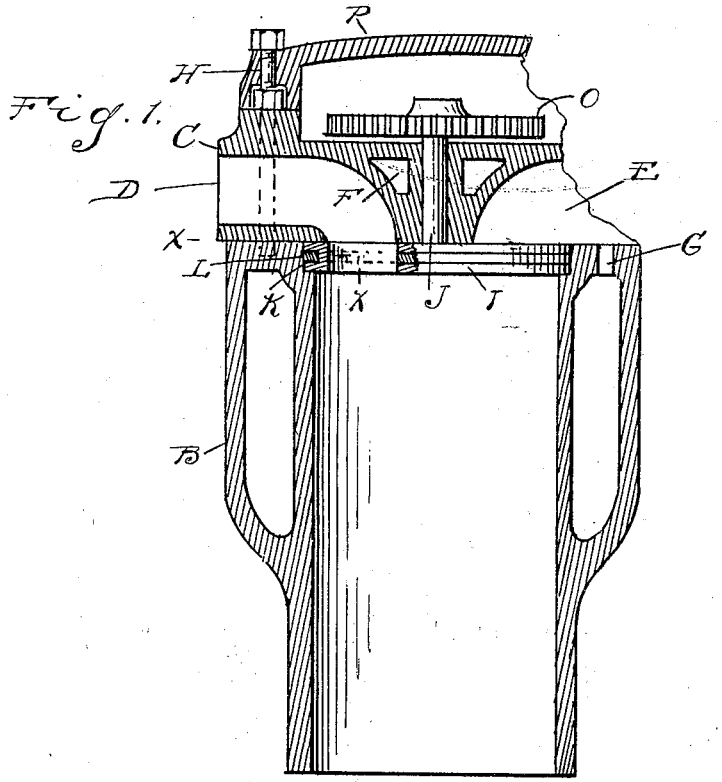
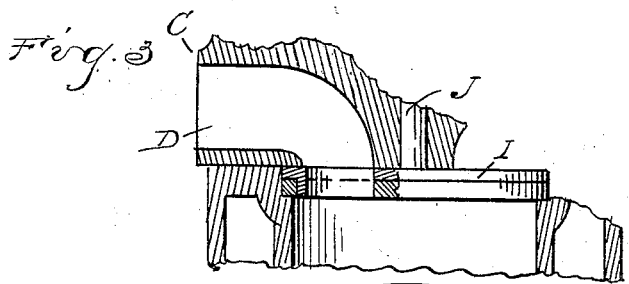
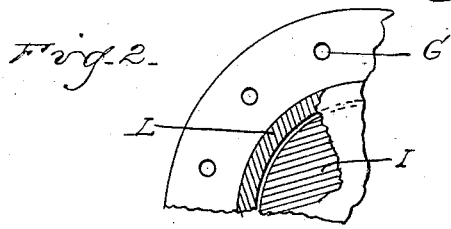
Witnesses
Inventor
Howard E. Coffin
By Whittemore Hulbert & Whittemore
Attys

UNITED STATES PATENT OFFICE.

HOWARD E. COFFIN, OF DETROIT, MICHIGAN.

EXPLOSION-ENGINE.

1,024,618.  Specification of Letters Patent.  Patented Apr. 30, 1912.

Application filed June 27, 1910. Serial No. 569,063.

*To all whom it may concern:*

Be it known that I, HOWARD E. COFFIN, a citizen of the United States of America, residing at Detroit, in the county of Wayne and State of Michigan, have invented certain new and useful Improvements in Explosion-Engines, of which the following is a specification, reference being had therein to the accompanying drawings.

The invention relates to explosion engines of that type in which a rotary disk valve is employed, said valve being seated on the inner face of the head of the cylinder.

It is one of the objects of the invention to obtain a construction in which the engine cylinder and the head upon which the valve is seated may be formed of separable members, thereby facilitating access to the valve and simplifying the machine work in construction.

Another object is to protect the joint between the cylinder head so as to avoid leakage.

Still another object is to prevent leakage of the valve particularly at the periphery thereof and at points adjacent to the ports.

With these objects in view the invention consists in the construction as hereinafter set forth.

In the drawings,—Figure 1 is a longitudinal central section through an engine to which my improvements are applied. Fig. 2 is a section on line x—x Fig. 1. Fig. 3 is a view similar to Fig. 1 showing a modified construction.

A is the engine cylinder which is preferably provided with the usual surrounding water jacket B; C is a separable head for the cylinder in which the inlet and exhaust ports D and E are formed. This head is also chambered as at F to form a water jacket, and if desired this jacket may be placed in communication with the jacket of the cylinder through registering ports G. The head is secured to the cylinder by studs or tap bolts H, a suitable gasket being used to pack the joint.

I is a rotary valve which is seated upon the inner face of the head C and has an actuating stem or shaft J passing out through said head axial of the cylinder. The disk I is preferably of slightly greater diameter than the bore of the cylinder A, and the latter is provided with a recess or counterbore K to receive the valve. This will form an off-set or a break joint between the explosion chamber and the head of the valve which will decrease leakage. To further avoid leakage, the joint is preferably packed by a peripheral ring which as shown in Fig. 1, is a ring L engaging a peripheral groove in the disk I and bearing against the counterbore of the cylinder. In Fig. 3 a modified construction is shown in which a ring M is arranged at the angle of the counterbore and is adapted to engage a complementary angle or rabbet groove formed in the disk I. With both constructions, the packing ring in connection with the lubricating oil fed between the valve and its seat, will effectually seal the joint, preventing first, leakage from the valve ports around the periphery and second, leakage from the explosion chamber of the cylinder around the periphery of the valve and through the joint between the cylinder and the head. Furthermore, the engagement of the disk with the counterbore will protect the joint between the head and cylinder from the heat developed within the cylinder. The valve stem J may be driven by a gear O mounted thereon which is housed by a cap P secured to the head C. This construction also permits of readily casting the intake and exhaust headers integral with the head C of the cylinder as shown at Q and R Fig. 2.

What I claim as my invention is:

1. In an explosion engine, the combination of a cylinder, a separable head therefor, and a rotary disk valve seated upon said head and packing means for said valve protecting the joint between the head and cylinder.

2. In an explosion engine, the combination of a cylinder, a separable head therefor, a rotary disk valve seated upon said head, and packing means at the periphery of said valve for protecting the joint between said head and cylinder.

3. In an explosion engine, the combination of a cylinder, a separable head therefor, a rotary disk valve seated on said head and forming a break joint with said cylinder.

4. In an explosion engine, the combination with an engine cylinder, of a separable head therefor, a rotary disk valve seated on said head, and a packing ring engaging the periphery of said disk.

5. In an explosion engine, the combination with a cylinder, of a separable head therefor, a rotary disk valve seated on said head, and a packing ring engaging a groove in the periphery of said disk.

6. In an explosion engine, the combination with a cylinder, of a separable head therefor, a rotary disk valve of greater diameter than the bore of said cylinder seated on said head and engaging a counterbore at the end of said cylinder, and a packing ring engaging said counterbore and the periphery of said disk.

7. In an explosion engine, the combination of a cylinder having a recess at the top thereof of greater diameter than its bore, a rotary valve seated within said recess, an annular packing ring positioned intermediate the valve and its seat, and a detachable head for the cylinder having a portion extending over the periphery of the valve.

In testimony whereof I affix my signature in presence of two witnesses.

HOWARD E. COFFIN.

Witnesses:
ETHEL J. ESSIG,
C. W. DICKERSON.